Dec. 13, 1927.
N. O. ALLYN
1,652,885
TOOL FOR SURFACING CYLINDRICAL BORES
Filed Nov. 11, 1924    2 Sheets-Sheet 1
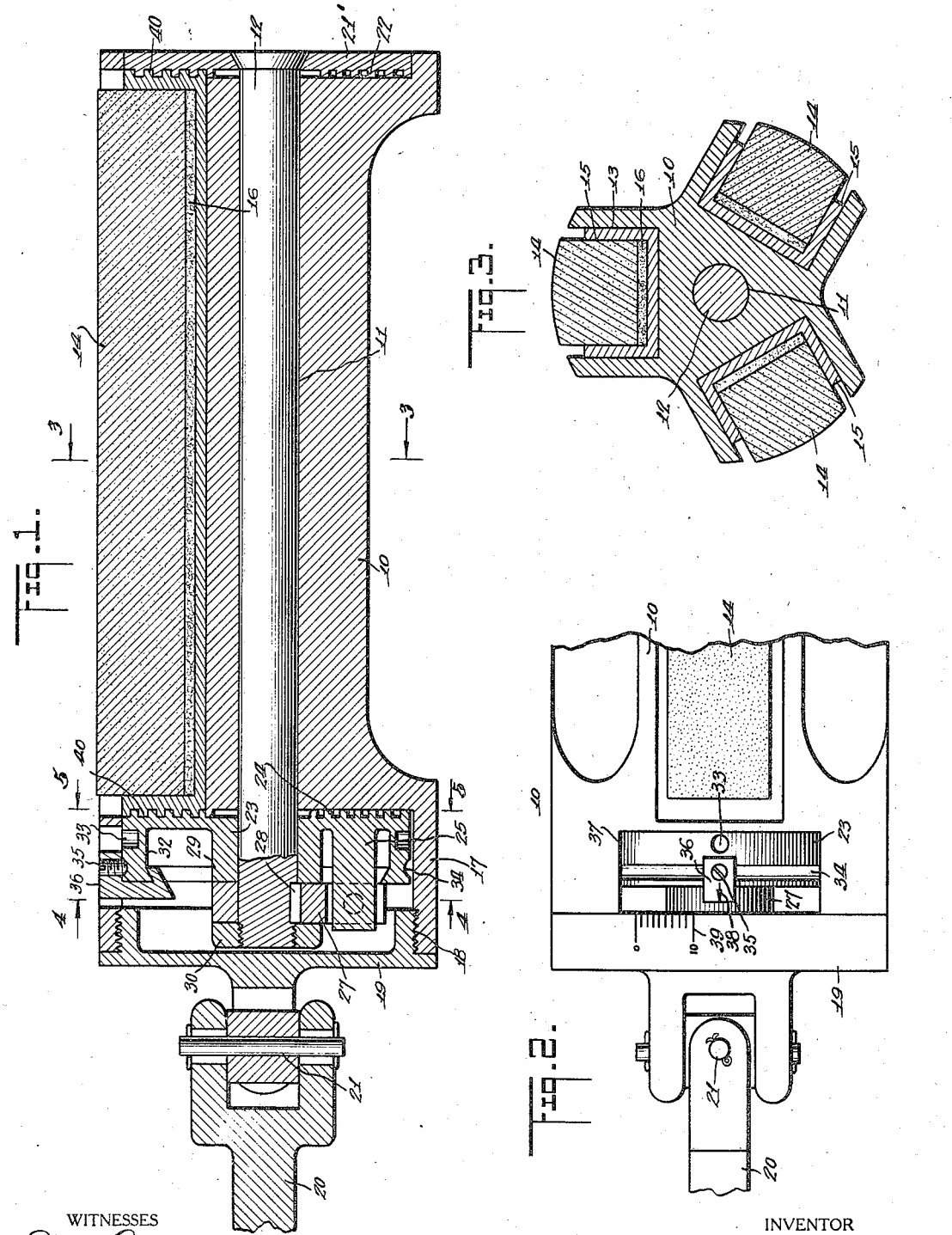
WITNESSES
INVENTOR
N. O. Allyn.
BY
ATTORNEYS Dec. 13, 1927.

N. O. ALLYN 1,652,885

TOOL FOR SURFACING CYLINDRICAL BORES

Filed Nov. 11, 1924 2 Sheets-Sheet 2

WITNESSES

INVENTOR
N. O. Allyn.
BY
ATTORNEYS

Patented Dec. 13, 1927.

1,652,885

UNITED STATES PATENT OFFICE.

NEWELL ORVILLE ALLYN, OF LEAVITTSBURG, OHIO.

TOOL FOR SURFACING CYLINDRICAL BORES.

Application filed November 11, 1924. Serial No. 749,260.

The present invention relates to new and useful improvements in tools for grinding, polishing, or burnishing cylindrical bores, and it pertains more particularly to a tool of this character especially adapted for refinishing the interior surfaces of internal combustion motor cylinders.

It is one of the primary objects of the invention to provide a tool in which the surfacing elements are moved radially as the tool is operated.

It is a further object of the invention so to construct the tool that the surfacing elements may be adjusted to compensate for wear thereof as the result of the surfacing action of the members.

It is a further object of the invention to provide means whereby a plurality of cylindrical bores may be refinished to a uniform predetermined dimension.

It is a still further object of the invention to construct the tool in such a manner that all of the radially movable surfacing members are simultaneously adjusted in unison.

With the above and other objects in view, reference is had to the accompanying drawings, in which Figure 1 is a longitudinal sectional view of a tool constructed in accordance with the present invention;

Fig 2 is a detail plan view thereof;

Fig. 3 is a transverse sectional view taken on the line 3—3 of Fig 1;

Figure 4:
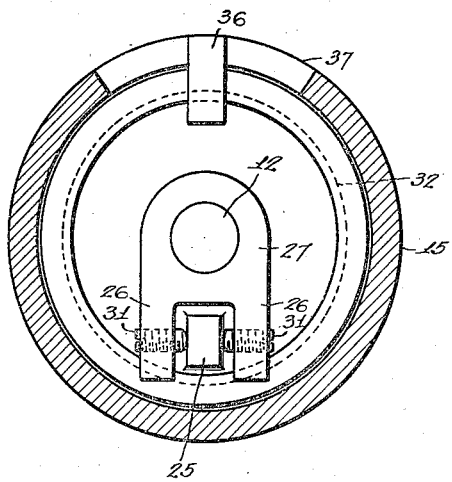
Fig. 4 is a transverse sectional view taken on the line 4—4 of Fig 1.
Figure 5:
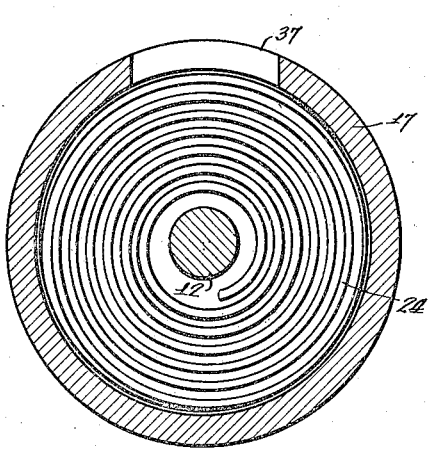
Fig. 5 is a transverse sectional view taken on the line 5—5 of Fig 1.

Referring more specifically to the drawings, the tool comprises a body portion 10 having a central passage 11 therethrough for the reception of and forming a bearing for the shaft 12. The body 10 of the tool is provided with three equidistantly-spaced radially-disposed channels 13 which extend longitudinally of the body 10, and each of the channels carries a grinding element 14. These grinding elements are mounted in individual channels 15, and a suitable packing, such as felt, blotting paper, or the like, is interposed between the rear face of the grinding element 14 and its channel 15, as designated by the reference numeral 16. These channel members 15 are each movable in its respective channel 13, by a mechanism to be hereinafter described.

One end of the body 10 is formed with a housing 17 and such housing has an open end internally screw-threaded as at 18. Threaded into the open end of the housing 17 there is a plate or cover 19, connected to a suitable driving spindle 20 by a universal joint or coupling 21.

Rigidly secured to one end of the shaft 12, by means of welding or the like, there is a plate 21', and such plate is provided with a spiral thread 22. Mounted upon the other end of the shaft 12, there is a similar plate 23 having a spiral thread 24. The second-mentioned plate 23 has a lug 25 projecting therefrom, and said lug is adapted to extend between the furcations 26 of a bifurcated lug 27, which bifurcated lug 27 is keyed to the shaft 12 by means of a key 28. This bifurcated lug 27 is held in position upon the shaft 12 against a hub extension 29 of the plate 23, by means of a nut 30. Each of the furcations 26 of the bifurcated lug 27 carries a set screw 31, and said set screws are adapted to engage the lug 25, as more clearly shown in Fig. 4.

The plate 23 is provided with a flange 32 and such flange is provided with a plurality of openings 33 for the reception of a tool for rotating the same. The flange 32 is also provided with a channel 34 for the reception of a screw 35 carried by a stop member 36, which when the screw 35 is loosened, is freely movable around the flange in the plate 23. This stop 36, as more clearly shown in Fig. 2, is operable in a cut-out portion 37 in the body 10, and has a pointer 38 adapted to operate in conjunction with calibrations 39 carried by one of the side walls of the cut-out portion 37 for a purpose to be hereinafter more specifically set forth.

Figure 6:
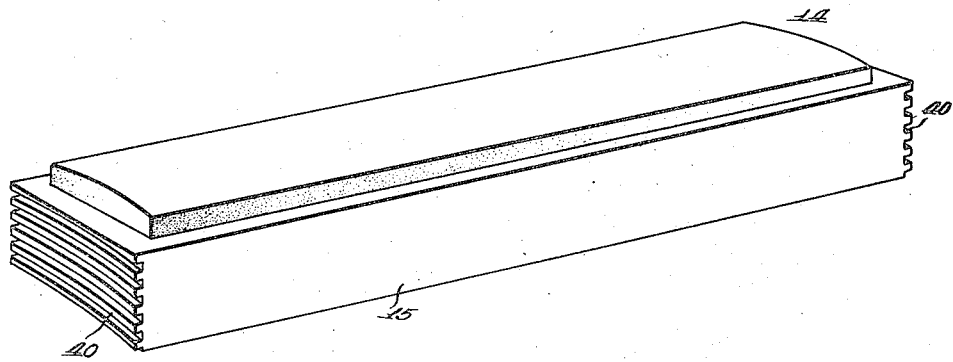
Fig. 6 is a detail perspective view of one of the surfacing elements.

As more clearly shown in Fig. 6, each of the channel members 15 has curved threads 40 formed on each of the ends, and these threads 40 are adapted to engage the spiral threads of their respective plate 21' or 23, for the purpose of moving the channel members 15 radially of the body portion either inwardly or outwardly thereof.

The device operates in the following manner: The entire device is adapted to be rotated by means of the shank 20, which is connected to any suitable rotary driving means, such, for example, as a motor-operated drill press or the like. The plates 21' and 23 are rotated until the grinding elements 14 are moved inwardly of the body 10 to permit of the centering body being inserted into the bore to be operated upon, such, for example, as an internal combustion motor cylinder. Upon placing the device within the cylinder, it is rotated and the grinding elements moved into engagement with the interior surface of the bore to resurface the same.

In order to determine the extent to which the device will operate to bore the cylinder, the stop 36 is adjusted upon the flange 32 and when said stop engages the end wall of the cut-out 37 at the top of Fig. 2, the grinding elements 14 will no longer be forced outwardly of the body since the stop prevents further rotary movement of the plates 21' and 23.

In reboring an internal combustion motor cylinder, the plate 23, the shaft 12 and the plate 21' are rotated so that the stop 36 moves downwardly in Fig. 2. This draws the grinding elements 14 inwardly of the body 10. The device is now inserted into the bore to be operated upon and the plates 21' and 23 together with the shaft 12 are rotated until the grinding elements move into engagement with the bore being resurfaced.

After this has been done, the stop 36 is set in engagement with the upper end wall of the cut-out portion 37 in Fig. 2. The plate 23 is now rotated in the opposite direction to draw the grinding elements inwardly of the body 10, after which it is inserted in the next cylinder and the body 10 is rotated until sufficient material is removed from the cylinder to permit the stop 36 engaging the end of the cut-out portion 37 at the top in Fig. 2, when both cylinders will be of approximately the same bore, the difference between the two being that due to a partial wearing away of the grinding elements.

After the second cylinder has been thus far completed a caliper reading thereof is taken and the difference between its dimension and that of the first cylinder is calculated. The stop 36 is then moved downwardly in Fig. 2 sufficiently to permit of this amount of material being removed from the second cylinder, after which the grinding operation is again started, and when the stop 36 reaches the upper end of the cut-out portion 37 in Fig. 2, the two cylinders will be of the same dimension.

From the foregoing it is apparent that the present invention provides a new and improved form of cylindrical bore-resurfacing tool in which a plurality of cylindrical bores may be uniformly ground or resurfaced, and, furthermore, the construction of the tool permits of this operation being carried out after the minimum and maximum adjustments of the tool have been made corresponding to the refinished surface of the first cylindrical bore operated upon.

What is claimed is:

1. A tool of the character described comprising a body, grinding elements, carriers for mounting the grinding elements on the body for radial movement, means rotatable relative to the body and cooperable with the carriers for moving the grinding elements radially inward and outward, a stop mounted for adjustment on said means and releasable fastening means for securing the stop in any adjustment relative to said first mentioned means, said body having a slot receiving the stop, said stop being engageable with opposed walls of the slot to regulate the expansion and contraction of said grinding elements.

2. A tool of the character described comprising a body, grinding elements, carriers for mounting the grinding elements on the body for radial movement, each carrier having threads thereon, plates connected for simultaneous rotation and having spiral threads cooperable with the threads of the carriers, and a stop member adjustably and releasably fixed on one of said plates, said body having a slot receiving said stop member, said slot having opposed walls with which the stop member is engageable.

3. A tool of the character described comprising a body, grinding elements, carriers for mounting the grinding elements on the body for radial movement, each carrier having threads thereon, plates having spiral threads cooperable with the threads of the carriers, and a stop member adjustably and releasably fixed on one of said plates, said body having a slot receiving said stop member, said slot having opposed walls with which the stop member is engageable, a shaft extending between the plates, the plate on which the stop is mounted having a lug fixed thereto, and a bifurcated lug fixed to the shaft and having set screws engageable with the lug of the plate, the other plate being directly fixed to said shaft.

NEWELL ORVILLE ALLYN.